United States Patent
Lee et al.

(10) Patent No.: US 7,403,506 B2
(45) Date of Patent: Jul. 22, 2008

(54) SEAMLESS HANDOFF METHOD IN WIRELESS LOCAL AREA NETWORK

(75) Inventors: Choong-Hun Lee, Yongin-si (KR); Kyung-Hun Jang, Suwon-si (KR); Chang-Woo Seo, Suwon-si (KR); Jin-Youn Cho, Seoul (KR); Hyo-Sun Hwang, Seoul (KR); Sung-Jea Ko, Seoul (KR); Chun-Su Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 403 days.

(21) Appl. No.: 11/141,114

(22) Filed: May 31, 2005

(65) Prior Publication Data

US 2005/0265287 A1    Dec. 1, 2005

(30) Foreign Application Priority Data

May 29, 2004    (KR)    ............... 10-2004-0038663

(51) Int. Cl.
*H04Q 7/20*    (2006.01)
(52) U.S. Cl. ............... 370/331; 370/328; 370/349; 455/438; 455/439
(58) Field of Classification Search ........ 370/331, 370/328, 349; 455/439, 438
See application file for complete search history.

(56) References Cited

U.S. PATENT DOCUMENTS

| | | | | |
|---|---|---|---|---|
| 2003/0016655 A1* | 1/2003 | Gwon | ........................ | 370/352 |
| 2003/0119527 A1* | 6/2003 | Labun et al. | ................ | 455/456 |
| 2003/0203735 A1* | 10/2003 | Andrus et al. | ............... | 455/450 |
| 2004/0252696 A1* | 12/2004 | Kakishima et al. | ........ | 370/395.2 |
| 2006/0099953 A1* | 5/2006 | Mansour | ..................... | 455/445 |

* cited by examiner

*Primary Examiner*—Danh C Le
(74) *Attorney, Agent, or Firm*—McNeely Bodendorf LLP (57) ABSTRACT

A handoff method is provided in a communication network including a plurality of fixed nodes attached to a router connected to at least one external network, and at least one mobile node associated with a current fixed node. The method detects movement of a mobile node; prepares a handoff of the mobile node from a current fixed node to potential fixed nodes upon detecting movement of the mobile node; decides whether to handoff to one of the potential fixed nodes as a target fixed node; and performs the handoff from the current fixed node to the target fixed node. The handoff method enables the mobile station to quickly move its association from one access point to another by minimizing a probe delay which is a primary contributor to handoff delay.

19 Claims, 8 Drawing Sheets

SEAMLESS HANDOFF METHOD IN WIRELESS LOCAL AREA NETWORK

PRIORITY

This application claims priority to an application entitled "Seamless Handoff Method In Wireless Local Area Network" filed with the Korean Intellectual Property Office on May 29, 2004 and assigned Serial No. 2004-38663, the contents of which are hereby incorporated by reference.

BACKGROUND OF THE INVENTION

1. Field of the Invention

The present invention relates to wireless local area networks (WLANs), and in particular, to a seamless handoff method in the WLAN.

2. Description of the Related Art

A wireless local area network (WLAN) is a type of local area network (LAN) that uses high frequency radio waves rather than wires to communicate between terminals (stations). The WLAN is practical to use in an environment where wire distribution is not allowed or the deployment of the network changes frequently. The WLAN uses a random access technique for media access to allow the stations to competitively transmit data. Since, in the random access scheme, data loss occurs due to the collisions of packets on the radio media and it is difficult to detect the data collisions at the transmitter by nature of the wireless media, a collision avoidance technique is required. Generally, the WLAN adopts carrier sense multiple access/collision avoidance (CSMA/CA), as the collision avoidance scheme, in which collisions or errors can be indirectly monitored during a basic procedure of the data transmission from the transmitter to the receiver. If the transmitter does not receive an acknowledgement of the transmitted data, it retransmits the data after a predetermined time lapses.

Typically, the WLAN has a plurality of Basic Service Sets (BSSs), with each BSS having an Access Point (AP) connected to a wired network, and a plurality of wireless stations (STAs).

Communication within the BSS is provided through the AP such that the STAs are required to associate with an AP in order to access to the network. Thus, when deciding to establish an association with the network, the STA first searches for an AP to be associated with before transmitting data. During the course of data transmission after the association, the STA may roam out of the service area of the current AP. In this case, since the APs use different channels to prevent from interference with each other, the STA must release the association with the current AP and establish a new association with a new AP, which is called a "handoff" in wireless communication terminology. Typically, the BSSs have coverage areas overlapping each other such that the STAs can roam from one area to another within the WLAN and maintain communication anywhere in the WLAN.

Handoff can occur when the STA roams within the BSS or moves into range of other BSSs. Handoff delay is a significant issue for real time multimedia services such as voice-over-IP, video teleconference, and the like.

Figure 1:
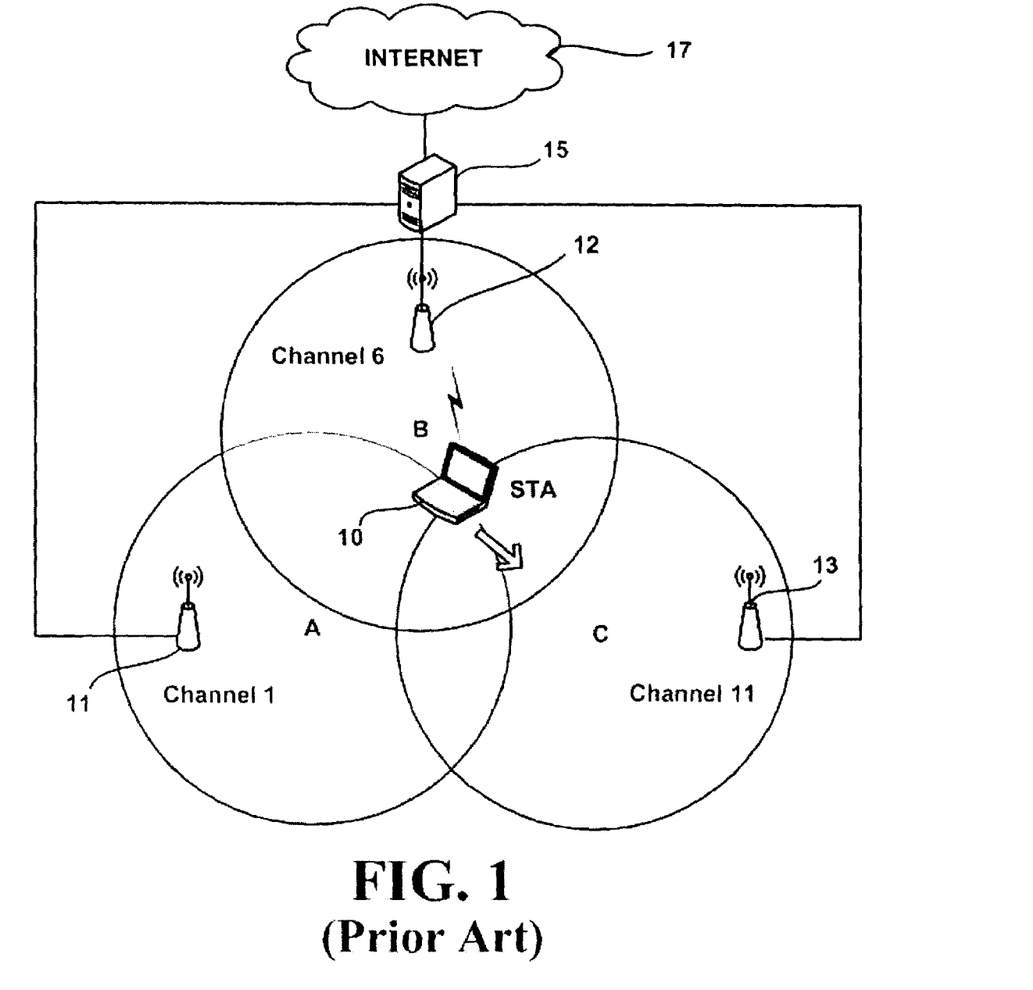
FIG. 1 is a schematic diagram illustrating a conventional WLAN structure.

FIG. 1 shows a typical WLAN structure. In FIG. 1, three access points 11, 12, and 13 are connected to the Internet 17 through a gateway 15 and their coverage areas overlap with each other. The access points 11, 12, and 13 are assigned different radio channels, i.e., respective channel 1, channel 6 and channel 11. In this example, AP2 12 communicates with STA 10 through the channel 6.

When STA 10 moves from service area (B) of the AP2 12 to service area (A or C) of the AP1 11 or AP3 13 while communicating with the AP2 12, handoff occurs. Typically, the handoff procedure comprises scanning, authentication, and association processes. Scanning is a process that attempts to discover the existence of APs and to gather information on the APs. There are two ways for a mobile node to scan for existing APs, active scanning and passive scanning.

For passive scanning, the STA listens for beacon frames, which are periodically transmitted by APs. For active scanning, the STA sends out a probe frame on specific channel to solicit response frames from the APs.

In the passive scanning technique, it typically takes more than 300 msec for receiving the beacon frames from the APs and obtaining information on the APs from the beacon frames. Also, in the active scanning technique, it typically takes more than 300 msec since the STA sends the probe frame when it does not receive the beacon frame within a predetermined time and to obtain the information on the APs from the response frame. After obtaining the information on the APs the STA determines whether or not to join the Basic Service Set (BSS). If the STA determines to join the BSS, the STA enters the authentication process.

Authentication is a process of determining whether the STA is what it is declared to be for security by communicating information between the STA and AP.

After passing the authentication process, the STA enters the association process. In the association process, the STA and the AP exchange information on the capability of the BSS, and a distribution system service (DSS) is triggered in order for the AP to communicate with another APs to exchange frames for the STA in their respective BSSs, forward frames to follow mobile stations as they move from one BSS to another, and exchange frames with a wired network. After the STA associates with an AP through the association process, the STA can transmit data.

Figure 2A:
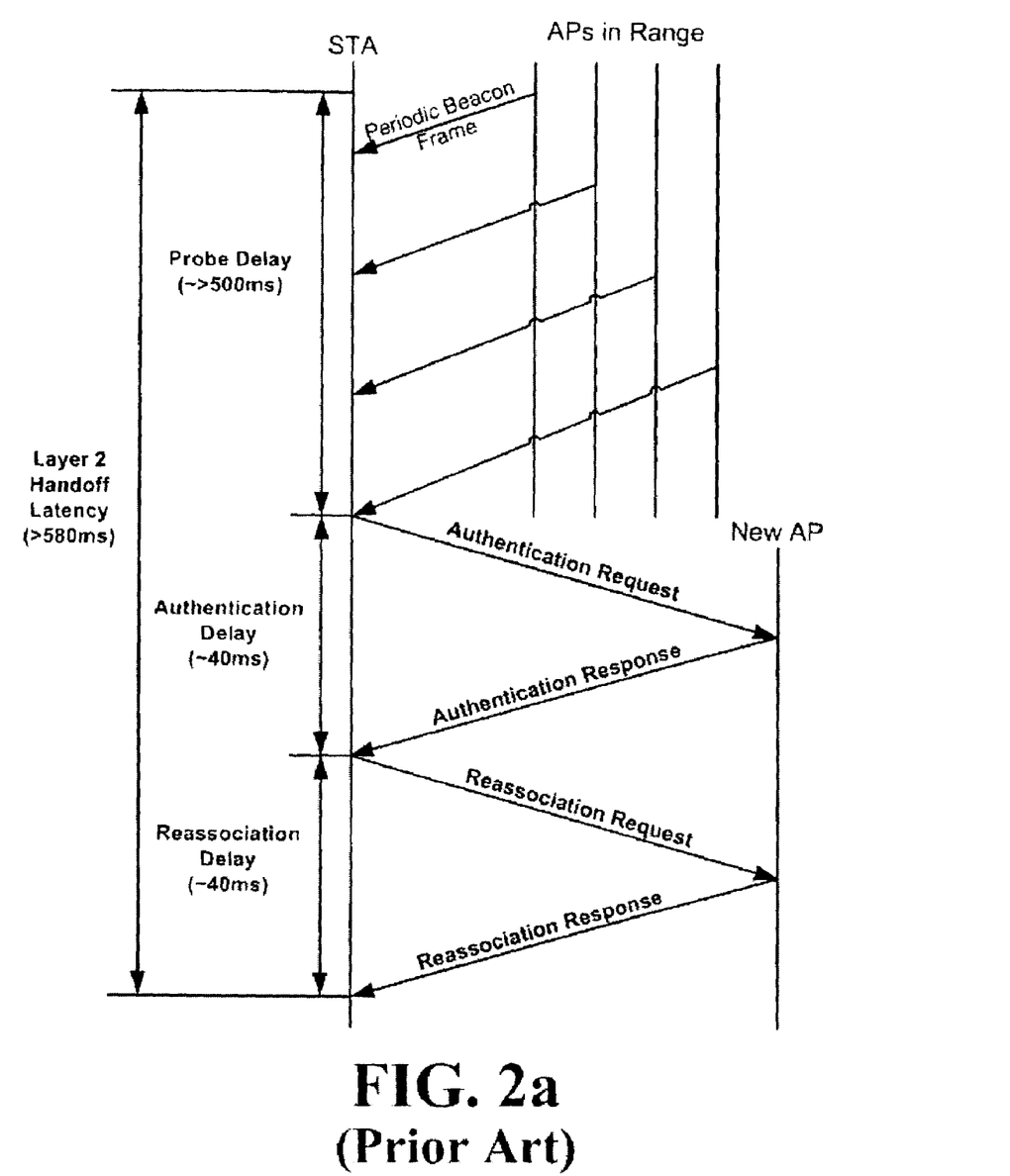
FIG. 2a is a flow diagram illustrating a conventional handoff method using a passive scanning procedure.
Figure 2B:
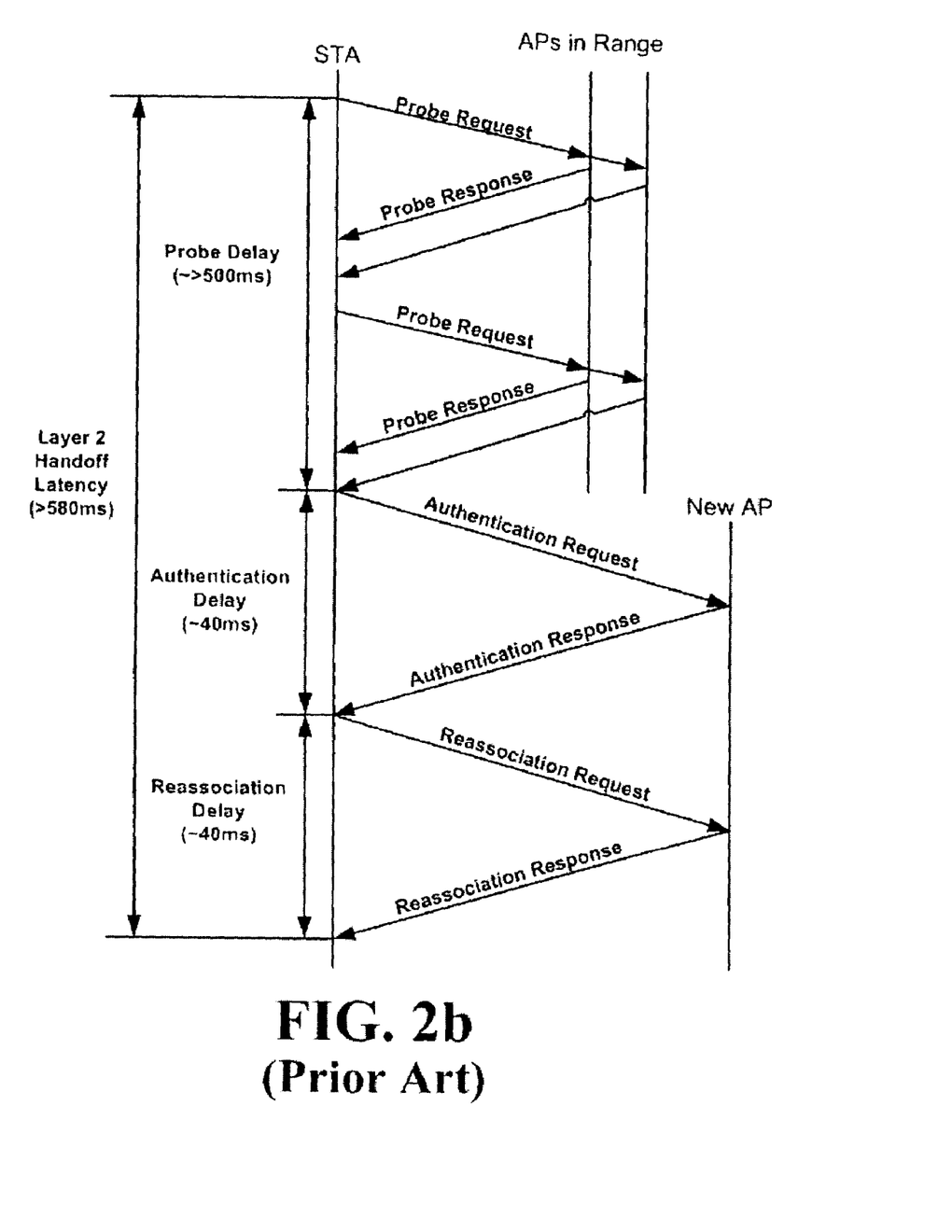
FIG. 2b is a flow diagram illustrating a conventional handoff method using an active scanning procedure.

FIG. 2a and FIG. 2b are message flowcharts for illustrating a conventional passive scanning-based handoff technique and a conventional active scanning-based handoff technique, respectively. As shown in FIG. 2a and FIG. 2b, the probe delays are main contributors to the entire handoff latency in both cases.

Figure 3A:
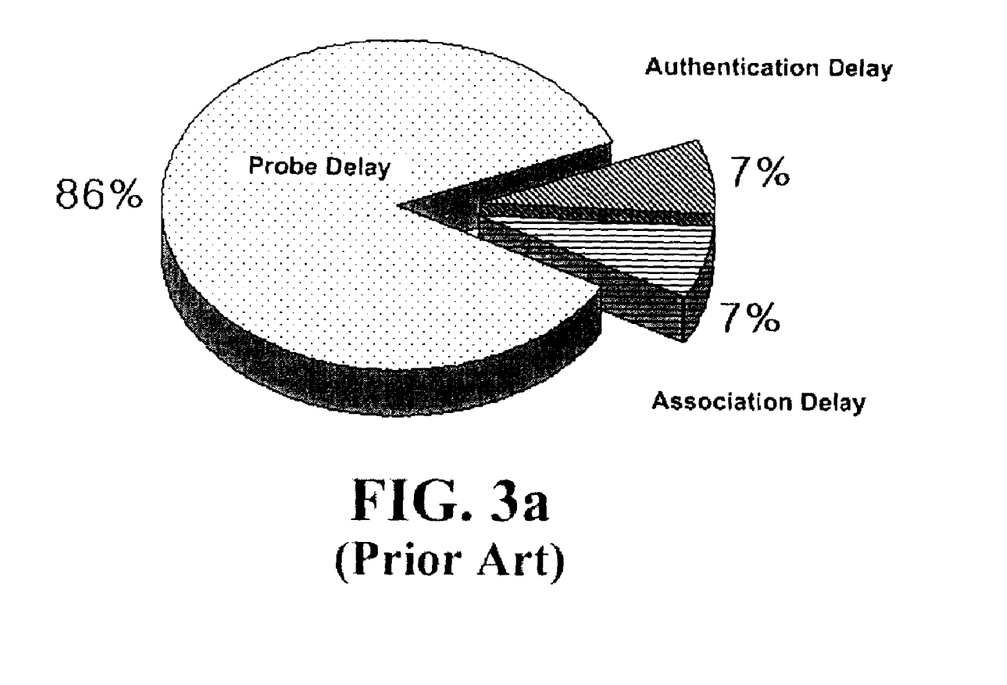
FIG. 3a is a chart illustrating delay distributions in the entire handoff latency according to a conventional passive scanning-based handoff.
Figure 3B:
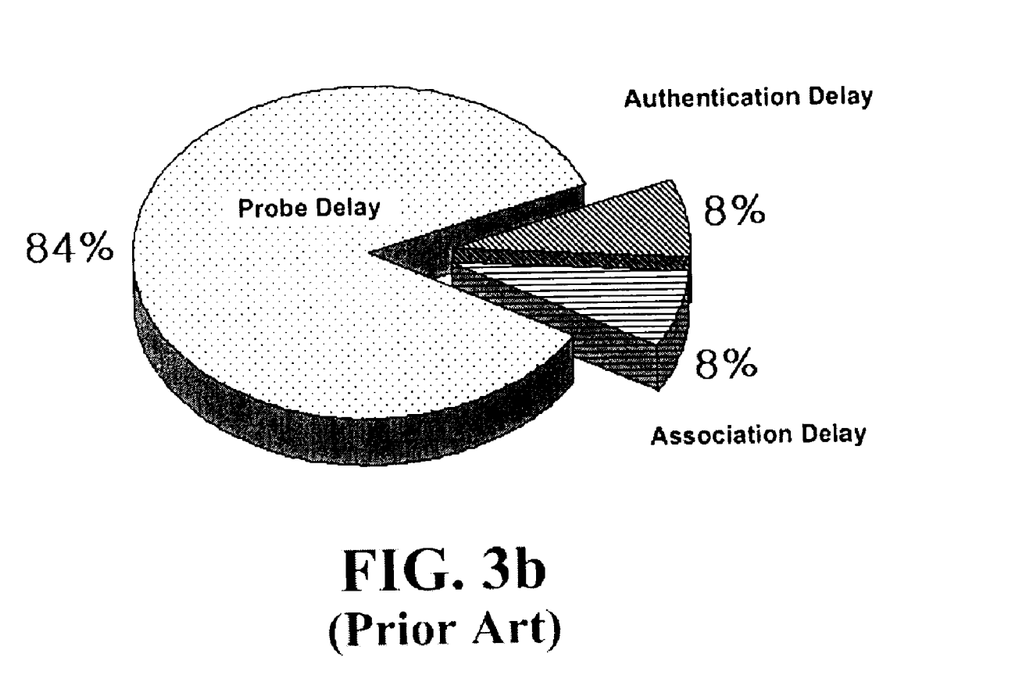
FIG. 3b is a chart illustrating delay distribution in the entire handoff latency according to a conventional active scanning-based handoff.

FIG. 3a and FIG. 3b are pie charts for illustrating percentages of delays occurring during the handoff procedure in the conventional passive scanning-based handoff technique and the active scanning based handoff technique, respectively. As shown in FIG. 3a and FIG. 3b, the probe delay is dominant in both the passive scanning-based handoff and active scanning-based handoff.

Thus, there is a need to reduce the probe delay for implementing seamless handoff in the WLAN.

SUMMARY OF THE INVENTION

The present invention has been made in an effort to solve the above problems and an aspect of the present invention is to provide a handoff method in WLAN, which is capable of minimizing the entire handoff latency.

It is another aspect of the present invention to provide a handoff method enabling the mobile station to quickly move its association from one access point to another by minimizing a probe delay which is a primary contributor to the handoff delay.

It is another aspect of the present invention to provide a handoff method which can be adopted between different systems by exchanging upper layer information between the access points before the handoff occurs.

To achieve the above aspects, a handoff method is provided for a communication network including a plurality of fixed nodes attached to a router connected to one or more external networks and at least one mobile node associated with a current fixed node. The handoff method detects, by at least one of potential fixed nodes, movement of a mobile node in a service area overlapped with a service area of the current fixed node; prepares a handoff of the mobile node from the current fixed node to the at least one of potential fixed nodes upon detecting the movement of the mobile node; decides, at the mobile node, to implement the handoff to one of the potential fixed nodes as a target fixed node; and performs, at the mobile node, the handoff from the current fixed node to the target fixed node, wherein each of the fixed nodes communicates with neighbor fixed nodes to support the handoff of the mobile node and monitors neighbor channels by using a dedicated reception module to detect movement of the mobile node.

Preferably, detecting movement of the mobile node is accomplished by monitoring, at each fixed node, channel states of the neighbor channels; and determining the movement of the mobile node on the basis of changes of the channel states.

Preferably, preparing the handoff includes transmitting the channel states from each fixed node to the router; creating, at the router, a list of the potential fixed nodes in a prioritized manner; transmitting the list from the router to the mobile node; and preparing, at the potential fixed nodes, for the handoff.

Preferably, deciding the handoff includes selecting one among the potential fixed nodes as the target fixed node according to priorities of the potential fixed nodes at the list.

In another aspect of the present invention, a handoff method is provided for a wireless local area network (WLAN) including a plurality of access points (APs) attached to a router which stores a neighbor graph (NG) and is connected to one or more external networks and at least one mobile node (MN) associated with a current access point. The handoff method detects, at neighbor APs of the current AP, movement of the MN by monitoring neighbor channels in a service area overlapped with a service area of the current AP, receives, at the MN, information of the neighbor APs via the current AP, and decides, at the MN, a handoff of the MN from a current AP to a new AP among the neighbor APs upon detecting the movement of the MN; exchanges handoff initiation information between the new AP and the MN upon deciding the handoff; and associates the MN with the new AP on the basis of the handoff information, wherein each of the APs monitors neighbor channels by using a dedicated reception module to detect movement of the mobile node.

Preferably, detecting the movement of the MN is accomplished by monitoring, at each AP, traffic on the neighbor channels; extracting header information from the traffic; checking changes of the traffic based on the header information; and determining the movement of the MN on the basis of the changes.

Preferably, handoff is decided by reporting, at each AP, the movement of the MN to the router; transmitting the NG stored in the router to the MN; and selecting, at the MN, the new AP on the basis of the NG.

BRIEF DESCRIPTION OF THE DRAWINGS

The above and other aspects, features and adventures of the present invention will be more clearly understood from the following detailed description taken in conjunction with the accompanying drawings, in which.

DETAILED DESCRIPTION OF THE PREFERRED EMBODIMENT

Preferred embodiments of the present invention will be described hereinafter with reference to the accompanying drawings. In the drawings, the same or similar reference numbers will be used throughout the drawings to refer to the same or like parts.

The present invention provides a handoff method in a wireless local area network (WLAN) that minimizes handoff latency and enables a mobile station to quickly move association of the mobile station from one access point (AP) to another by minimizing a probe delay, a primary contributor to handoff delay. In the present invention, a Radio Frequency (RF) module dedicatedly responsible for reception is added to the AP.

Figure 4:
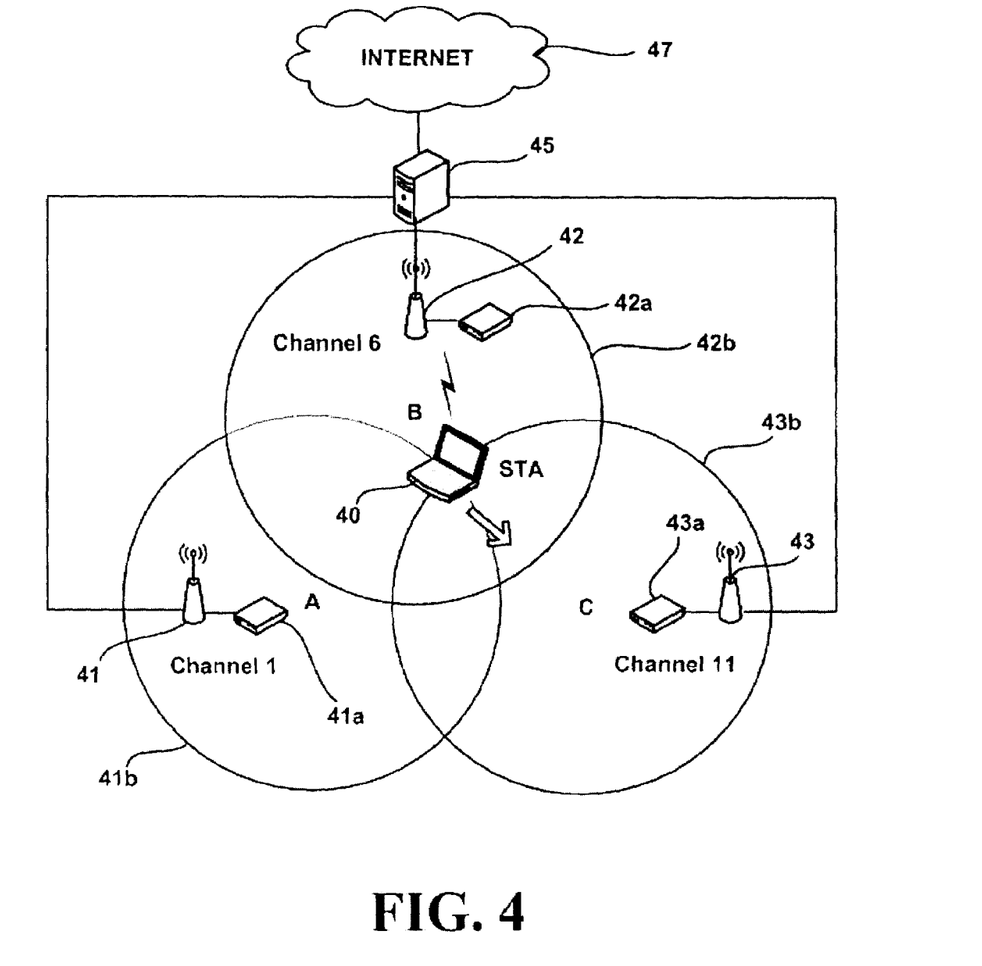
FIG. 4 is a schematic diagram illustrating a WLAN structure according to a first embodiment of the present invention.

FIG. 4 is an exemplary schematic diagram illustrating a WLAN structure according to a first embodiment of the present invention.

As shown in FIG. 4, a WLAN according to the present invention includes three access points APs 41, 42, and 43 associated with each other so as to overlap their service areas, and the APs 41, 42, and 43 are connected to the Internet 47 through a gateway 45. In this embodiment, a wireless station (STA) 40 is assumed to be currently associated with the AP 42 in the coverage area (cell) 42b and moves into a coverage area 43b of the AP 43. Since the APs 41, 42 and 43 use different channels, channel 1, channel 6, and channel 11, respectively, a handoff occurs. The APs 41,42, and 43 are provided with dedicated RF reception modules 41a, 42a, and 43a, respectively.

Each reception module 41a, 42a, and 43a monitors the states of the radio channels. Thus, if the STA 40 comes close to AP 43, AP 43 provides STA 40 with AP information of AP 43, such as channel number, Medium Access Control (MAC) address, Basic Service Set Identification (BSSID), and the like for supporting a seamless handoff.

Upon receiving the AP information from AP 43, STA 40 decides handoff based on the AP information gathered from AP 43 and AP information of the currently associated AP 42.

In order to support the seamless handoff, handoff prediction information, called trigger information, is transferred to an upper layer. Upon receiving the trigger information, the upper layer performs various operations so as to prepare the handoff.

Figure 5:
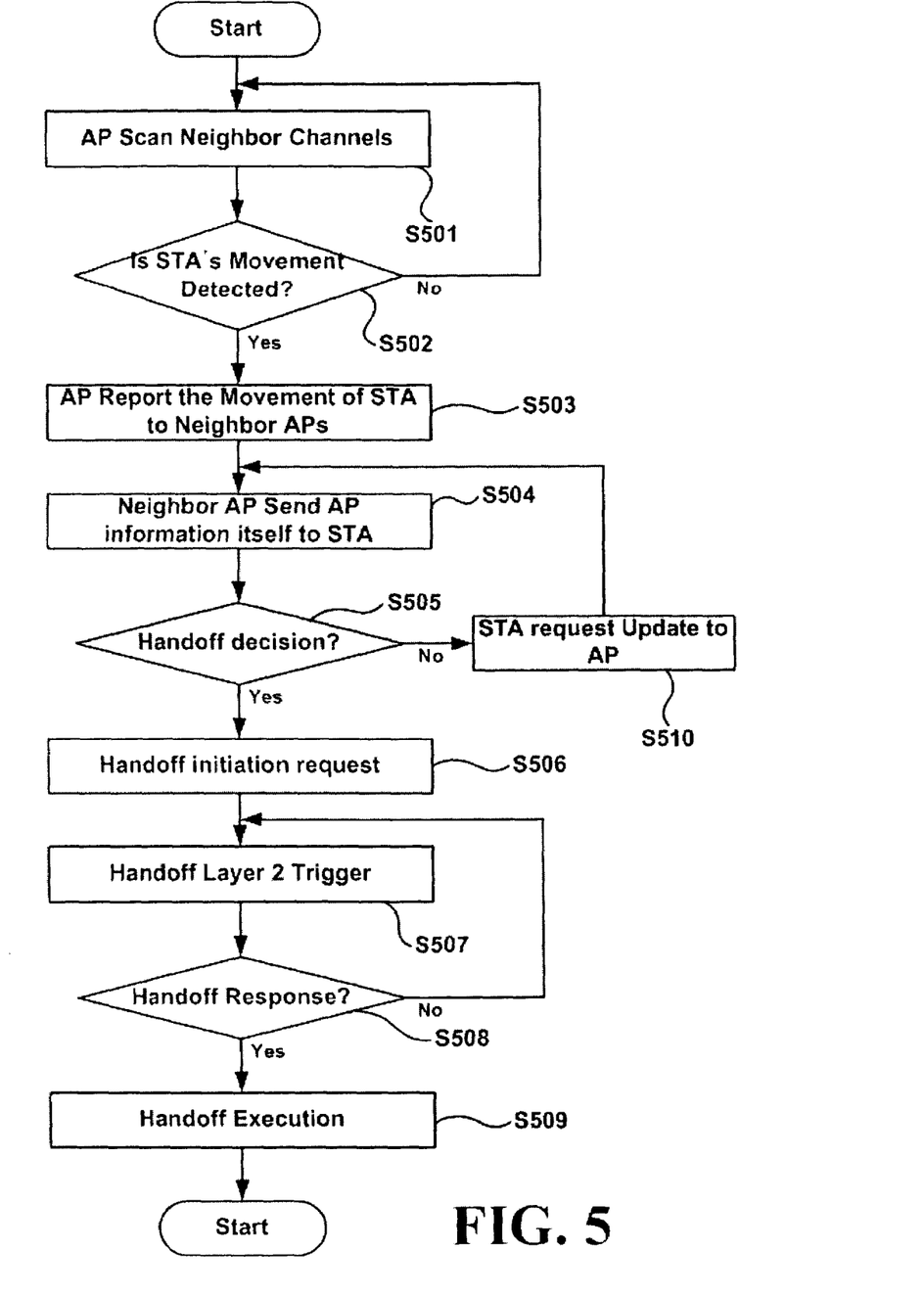
FIG. 5 is a flowchart for illustrating the seamless handoff method according to the first embodiment of the present invention.

Now, the handoff operation in the above structured WLAN will be described in detail. FIG. 5 is a flowchart for illustrating the seamless handoff method according to the first embodiment of the present invention.

Once each AP is turned on, a particular AP receives radio frames transmitted from STAs located in the service area of the particular AP through use of the dedicated reception module provided with the particular AR, and the particular AP extracts MAC headers from the radio frames. By analyzing the information contained in these MAC headers, the particular AP acquires information of the respective STAs, such as the types of STAs.

Sequentially, each AP monitors neighbor channels by using the dedicated reception module to detect movements of STAs at step S501. The AP determines whether a movement of an STA approaching the service area of the AP is detected according to a strength variation of received signal strength indicator (RSSI) received from neighbor channels at step S502. Furthermore, each AP tries to share information of the AP itself with the STA associated thereto at step S503.

The AP sends the STA movement information together with AP information of itself such as RSSI, channel number, service type, and the like to neighbor APs. The information on the STAs and APs is shared in this manner.

After detecting movement of the STA, the neighbor AP sends the AP information of itself to the STA via a current AP associated with the STA at step S504. The AP information includes the RSSI, channel number, and service classes.

Upon receiving the AP information of the neighbor AP(s), the STA determines whether to handoff from the current AP to a neighbor AP based on the strength of RSSI, channel number, and service classes included in the AP information at step S505. If the AP information satisfies handoff conditions, the STA requests a handoff initiation to the neighbor AP through a handoff initiation request message at step S506, and otherwise, the STA sends an update request to the AP at step S510.

Upon reception of the handoff initiation request message, the neighbor AP performs an authentication process and other handoff related operations to provide the STA with service without interruption at step S507. At this time, in order to prepare the expected handoff, trigger information is transferred to an upper layer. Also, the neighbor AP transmits an acknowledgement, in response to the handoff initiation request, through use of a handoff initiation response message.

The STA then determines whether the handoff initiation response message has been received at step 508. If the STA receives the handoff initiation response message, the STA executes the handoff at step S509 and ends the handoff procedure. Otherwise, the STA resends the handoff initiation request message at certain times, and the process returns to step S507.

The handoff is carried out using the channel information of the neighbor AP, such as BSS ID, MAC address, RSSI, etc., and the network is updated after the handoff is completed in order for other APs to share the status information of the AP and STA.

Figure 6:
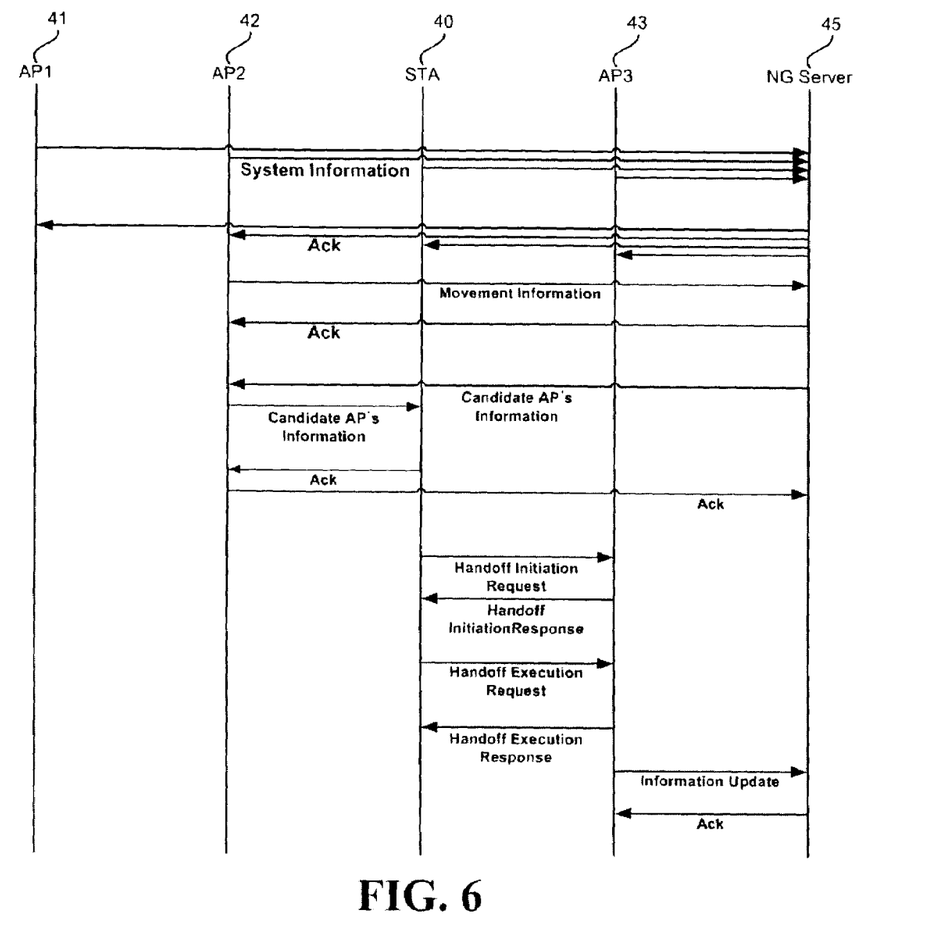
FIG. 6 is a flow diagram for illustrating message flows between a NG server, APs, and STAs according to a second embodiment of the present invention.

FIG. 6 is a flow diagram illustrating message flows between a NG server, APs, and STAs according to a second embodiment of the present invention.

The structure of the WLAN of the second embodiment is identical with that of the first embodiment except that the gateway is replaced with a neighbor graph server. In the second embodiment of the present invention, the neighbor graph server is denoted by the reference numeral 45 that had identified the gateway in the first embodiment.

The neighbor graph server 45 stores a neighbor graph for the purpose of keeping track of the neighbor APs and provides STA 40 with the information of the neighbor APs once movement of the STA is detected. NG 45 contains the MAC addresses and IP addresses of pairs of AP and neighbor AP pairs, and channels through which each pair of APs can communicate.

Upon receiving the APs information from NG server 45, STA 40 selects one AP from among the APs listed in the neighbor AP information as a handoff target AP.

In FIG. 6, firstly AP1 41, AP2 42, AP3 43, and STA 40 register their own information to the neighbor graph (NG) server 45 through registration messages such that NG server 45 configures a neighbor graph on the basis of the information contained in the registration messages. The registration message received from each AP or STA includes a MAC and IP addresses of the associated AP or STA, channel numbers, channel utilization, and etc.

Upon receiving the registration messages from APs 41, 42, and 43, and STA 40, NG server 45 sends acknowledgements to the respective APs 41, 42, and 43 and STA 40 in response to the respective registration messages.

Each AP monitors the neighbor channels through use of the RF module associated with the AP to detect movement of STA 40. In this embodiment, as shown in FIG. 4, STA 40 moves from coverage area 42*b* of AP2 to coverage area 43*b* of AP3.

Once movement of an STA is detected, AP2 42 sends a movement detection message to NG server 45. The movement detection message includes RSSI and link quality of the current associated AP.

Upon reception of the movement detection message, NG server 45 sends an acknowledgement to AP2 42 in response to the movement detection message and sends a handoff candidate AP message to STA 40 via AP2 42. The handoff candidate AP message includes MAC and IP addresses and channel information of the candidate APs. Accordingly, STA 40 selects one of the neighbor APs as a handoff target AP on the basis of the information on the APs in the handoff candidate AP message. In the second embodiment of the present invention, AP3 43 is the handoff target AP.

Upon reception of the handoff candidate information message, STA 40 sends an acknowledgement to NG server 45 via AP2 42 in response to the handoff candidate AP message and then sends a handoff initiation request message to AP3 43 on the basis of the information contained in the handoff candidate AP message. In response to the handoff initiation request message from STA 40, AP3 43 sends a handoff initiation response message to STA 40.

Sequentially, upon reception of the handoff initiation response message, STA 40 sends a handoff execution request message to AP3 43. Upon reception of the handoff execution request message, AP3 43 sends a handoff execution response message to STA 40 and sends an update message to NG server 45. The update message contains information on the neighbor APs and STAs associated the current AP.

Upon reception of the update message from AP3 43, NG server 45 transmits an acknowledgement to AP3 43 and updates the neighbor graph.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, in the handoff method of the present invention, each AP equipped with a reception-dedicated RE module monitors the neighbor channels and reports movement of an STA to a router whenever movement is detected, and the router provides the STA with information on the neighbor APs upon acquiring information of movement of the STA, such that the STA can quickly move association of the STA from one AP to another without interruption or requirement of a probe phase.

Also, in the handoff method of the present invention, since an STA quickly becomes aware of information of neighbor APs through use of a neighbor graph server, it is possible to minimize the probe delay which is the primary contributor to overall handoff latency.

Also, since the STA can obtain information of a candidate AP and the handoff candidate AP can prepare Layer 3 handoff prior to the handoff execution, the seamless handoff method of the present invention can be adopted for inter-system handoff.

Furthermore, in the handoff method according to the present invention, since the handoff occurs in a seamless manner it can support real time multimedia services such as VoIP, video teleconference, etc.

What is claimed is:

1. A handoff method for a communication network including a plurality of fixed nodes attached to a router connected to at least to one external network, and at least one mobile node associated with a current fixed node, the handoff method comprising:

detecting, by at least one of potential fixed nodes, movement of a mobile node in a service area overlapped with a service area of the current fixed node;

preparing a handoff of the mobile node from the current fixed node to the at least one of potential fixed nodes upon detecting the movement of the mobile node;

deciding, at the mobile node, whether to handoff to one of the potential fixed nodes as a target fixed node; and performing, at the mobile node, the handoff from the current fixed node to the target fixed node, wherein each of the fixed nodes communicates with neighbor fixed nodes to support the handoff of the mobile node and monitors neighbor channels by using a dedicated reception module to detect movement of the mobile node.

2. The handoff method of claim 1, wherein the target fixed node transfers trigger information to an upper layer in order to prepare the handoff.

3. The handoff method of claim 2, wherein the upper layer information includes Internet Protocol (IP) address.

4. The handoff method of claim 1, wherein detecting movement of the mobile node comprises:

monitoring, at each fixed node, channel states of neighbor channels; and determining movement of the mobile node on the basis of changes of the channel states, wherein the channel states include a received signal strength indicator (RSSI) of the neighbor channels.

5. The handoff method of claim 4, wherein preparing the handoff comprises:

transmitting the channel states from each fixed node to the router;

creating, at the router, a list of potential fixed nodes in a prioritized manner;

transmitting the list from the router to the mobile node; and preparing, at the potential fixed nodes, for the handoff.

6. The handoff method of claim 5, wherein deciding the handoff comprises selecting one among the potential fixed nodes as the target fixed node according to priorities of the potential fixed nodes of the list.

7. The handoff method of claim 4, wherein the channel states include information on the fixed nodes and mobile nodes occupying the channels.

8. The handoff method of the claim 4, wherein the channel states include upper layer information on the fixed nodes and the mobile nodes occupying the channels.

9. The handoff method of claim 8, wherein preparing the handoff includes:

transferring the upper layer information to an upper layer; and preparing upper layer handoff using the upper layer information.

10. A handoff method for a wireless local area network (WLAN) including a plurality of access points (APs) attached to a router connected to at least one external network, and at least one mobile node (MN) associated with a current access point (AP), the router storing neighbor graph (NG), the handoff method comprising:

detecting, at neighbor APs of the current AP, movement of the MN by monitoring neighbor channels in a service area overlapped with a service area of the current access point;

receiving, at the MN, information of the neighbor APs via the current AP;

deciding, at the MN, whether to handoff of the MN from the current AP to a new AP among the neighbor APs upon detecting movement of the MN;

exchanging handoff initiation information between the new AP and the MN upon deciding to handoff; and associating the MN with the new AP based on the handoff initiation information, wherein each of the APs monitors neighbor channels by using a dedicated reception module to detect movement of the mobile node.

11. The handoff method of claim 10, wherein detecting movement of the MN comprises:

monitoring, at each AP, channel states of neighbor channels; and determining movement of the MN based on changes of the channel states, wherein the channel states include a received signal strength indicator (RSSI) strength of the neighbor channels.

12. The handoff method of claim 11, wherein deciding whether to handoff comprises:

reporting, at each AP, movement of the MN to the router;

transmitting the NG stored in the router to the MN; and selecting, at the MN, the new AP on the basis of the NG.

13. The handoff method of claim 12, further comprising updating the NG after the MN is associated with the new AP.

14. The handoff method of claim 13, wherein updating the NG comprises:

transmitting update information from the new AP to the router; and reconfiguring, at the router, the NG according to the update information.

15. The handoff method of claim 12, wherein the NG includes AP information of the new AP.

16. The handoff method of claim 15, wherein the AP information includes a media access control (MAC) address of the new AP.

17. The handoff method of claim 15, wherein the AP information includes upper layer information.

18. The handoff method of claim 15 wherein the AP information includes an IP address of the new AP.

19. The handoff method of claim 15, wherein the AP information includes channel information of the new AP.

* * * * *